United States Patent
Iskandar et al.

(10) Patent No.: US 9,697,470 B2
(45) Date of Patent: Jul. 4, 2017

(54) APPARATUS AND METHOD FOR INTEGRATING MANUAL AND AUTOMATED TECHNIQUES FOR AUTOMATED CORRELATION IN DATA MINING

(71) Applicant: Applied Materials, Inc., Santa Clara, CA (US)

(72) Inventors: Jimmy Iskandar, Fremont, CA (US); Bradley D. Schulze, Phoenix, AZ (US); Kommisetti Subrahmanyam, Singapore (SG); Haw-Jyue Luo, Hsinchu (TW)

(73) Assignee: Applied Materials, Inc., Santa Clara, CA (US)

( * ) Notice: Subject to any disclaimer, the term of this patent is extended or adjusted under 35 U.S.C. 154(b) by 578 days.

(21) Appl. No.: 14/254,811

(22) Filed: Apr. 16, 2014

(65) Prior Publication Data

US 2015/0302311 A1    Oct. 22, 2015

(51) Int. Cl.
G06F 17/00    (2006.01)
G06F 17/20    (2006.01)
G06N 5/04    (2006.01)

(52) U.S. Cl.
CPC .................................. *G06N 5/048* (2013.01)

(58) Field of Classification Search
None
See application file for complete search history.

(56) References Cited

U.S. PATENT DOCUMENTS

| | | |
|---|---|---|
| 7,587,296 B2 | 9/2009 | Harvey, Jr. et al. |
| 7,831,326 B2 | 11/2010 | Lin et al. |
| 7,882,394 B2 | 2/2011 | Hosek et al. |
| 7,934,125 B2 | 4/2011 | Harvey, Jr. et al. |
| 8,010,321 B2 | 8/2011 | Lin et al. |
| 8,335,582 B2 | 12/2012 | Shimshi |

*Primary Examiner* — Luis Sitiriche
(74) *Attorney, Agent, or Firm* — Patterson + Sheridan, LLP (57) ABSTRACT

A method is provided for determining one or more causes for variability in data. The method includes selecting a first range of a multivariate model output data on a user interface and employing a computing system, operatively coupled to the user interface, to determine one or more process data causing a variability of the multivariate model output data in the first range when compared to a second range of the multivariate model output data. At least some of the process data includes data derived from a physical measurement of a process variable.

17 Claims, 4 Drawing Sheets

APPARATUS AND METHOD FOR INTEGRATING MANUAL AND AUTOMATED TECHNIQUES FOR AUTOMATED CORRELATION IN DATA MINING

BACKGROUND

Field

Aspects of the embodiments described relate generally to data mining and data correlation analysis. More particularly, the embodiments relate to integrating manual and automated techniques for data mining and data correlation analysis of industrial process data.

Description of the Related Art

Multivariate models can be used to detect when industrial processes are operating in an acceptable condition or a fault condition. Multivariate models enable operators of process-controlled equipment to monitor a relatively small number of metrics when compared to what can sometimes be an overwhelming number of data points monitored by a control system.

Multivariate models for a specific tool are often developed after a training period during which processes for the tool are repeated under controlled conditions and vast amounts of data, including faults, are logged. The most relevant data is used to develop models for different portions of the processes. Then the models are tested to determine if the models accurately predict when the tool is operating in an acceptable condition or a fault condition. Once the models prove satisfactory, fault thresholds can be set, and the models can be deployed for use in production.

Multivariate models can also be used to detect faults that could not be detected by only one sensor or would at least be more challenging to detect. For example, using measurements from a specific pressure sensor and a specific flow meter, a system monitoring a multivariate model may be able to detect with a very high confidence that a specific valve is presenting a significant risk of failing in the near future. Such confidence can be obtained because the multivariate model of the pressure sensor and flow meter could show repeatable and identifiable patterns when that specific valve needs a specific type of maintenance, while these patterns could not be detected using univariate models. These identifiable patterns can be used in predictive maintenance (PdM) allowing a plant to perform maintenance at the most opportune times as opposed to the traditional maintenance schedules applied in preventive maintenance.

If the valve fault described above is recognized during the training period, then a multivariate model developer can include the fault as one of the multivariate faults that the system will monitor. If the valve fault is not recognized during the training period, then an operator may struggle to determine the problem despite noticing that a trend or value from one of the multivariate models is abnormal.

When faced with an abnormal pressure and flow signal, it may be obvious that a valve could be the issue. When faced with a somewhat abnormal set of values from a multivariate model, that could include dozens of inputs, the solution is not so obvious.

Fully automated data analysis systems cannot always be developed to detect every potential fault or issue that could occur on a piece of equipment. Similarly, strictly manually directed techniques for data analysis, such as computer routines for summarizing data, are too cumbersome to be cost effective in large data analysis problems. The shortfalls of fully automated data analysis systems and strictly manual techniques are especially true in attempts to determine what data or parameters are important in a correlation analysis exercise.

Therefore, a need exists for an improved monitoring system that enables an operator to quickly determine the possible causes of abnormalities in sets of values from multivariate models.

SUMMARY

In one embodiment, a method is provided for determining one or more causes for variability in data. The method includes selecting a first range of a multivariate model output data on a user interface and employing a computing system, operatively coupled to the user interface, to determine one or more process data causing a variability of the multivariate model output data in the first range when compared to a second range of the multivariate model output data. At least some of the process data comprises data derived from a physical measurement of a process variable.

In another embodiment, a process data analyzer is provided. The process data analyzer includes a computing system configured to accept a selection of a first range of a multivariate model output data. The computing system includes a memory for storing multivariate model output data and a code, and a processor to execute the code. The code includes instructions for determining one or more process data causing a variability between the first range and a second range of the multivariate model output data. At least some of the process data comprises data derived from a physical measurement of a process variable.

In another embodiment, a non-transitory computer-readable storage medium storing code for execution by a processor is provided. When the code is executed by the processor, the processor performs an operation for determining a cause for variability in data including determining one or more process data causing a variability between a first range and a second range of multivariate model output data, wherein the first range is selected by a user. At least some of the process data comprises data derived from a physical measurement of a process variable.

BRIEF DESCRIPTION OF THE DRAWINGS

So that the manner in which the recited features of the embodiments described above can be understood in detail, a more particular description, briefly summarized above, may be had by reference to the following embodiments, some of which are illustrated in the appended drawings. It is to be noted, however, that the appended drawings illustrate only typical embodiments and are therefore not to be considered limiting of its scope to exclude other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A process data analyzer, a storage medium, and a method are described that provide advantages in determining causes for variability in process data.

Figure 1A:
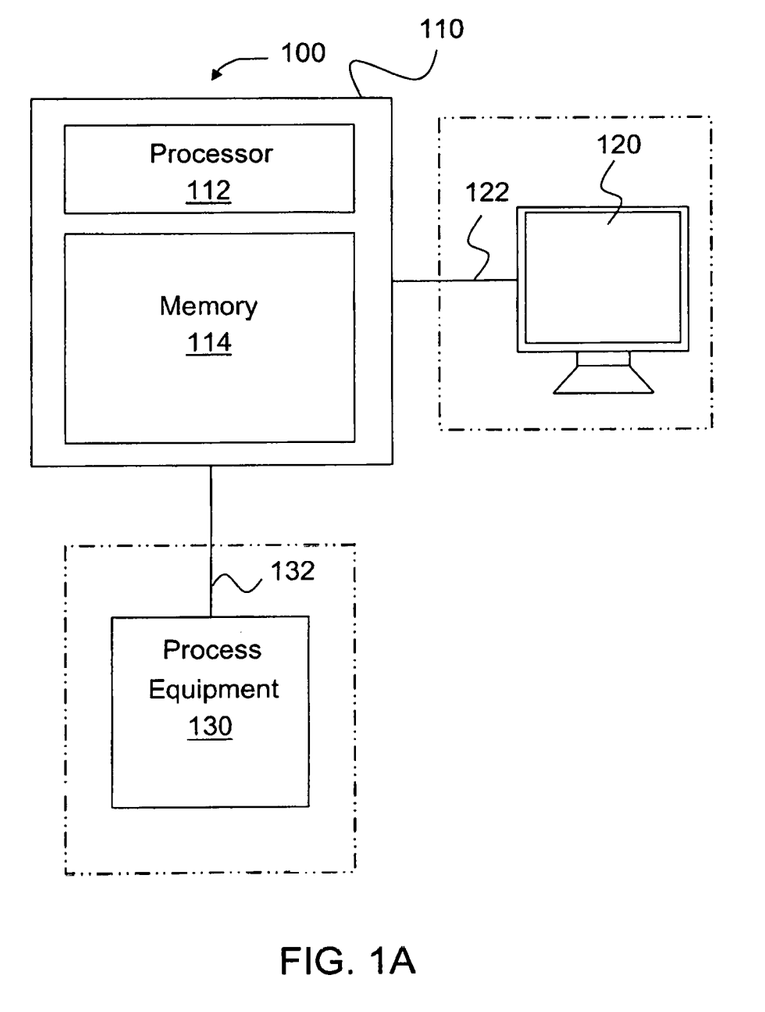
FIG. 1A is a block diagram of a process data analyzer according to one embodiment.

FIG. 1A is a block diagram of a process data analyzer 100 according to one embodiment. The process data analyzer 100 includes a computing system 110. Computing system 110 includes at least a processor 112 and at least a memory 114. Processor 112 could include one or more central process units (CPU's) distributed among one or more devices (e.g., server, personal computer, etc.). A CPU could include one or more processing components, such as a single-core processor, multi-core processor, microprocessor, integrated circuit (IC), application specific IC (ASIC), etc. Memory 114 could include memory distributed among one or more devices (e.g., server, personal computer, etc.) and include various types of memory components, such as random access memory (RAM), read only memory (ROM), cache, hard disk memory, solid-state memory, external storage media, etc.

Computing system 110 could be operatively coupled to at least one user interface 120 through user interface communication link 122. User interface 120 could be a graphical user interface (GUI) with a display (e.g., a monitor, screen, handheld device, television, etc.) with one or more input devices (e.g., a mouse, stylus, touch screen, touch pad, pointing stick, keyboard, or keypad).

Computing system 110 could be operatively coupled to process equipment 130 through process equipment communication link 132. Process equipment 130 could include all of the field devices (e.g., actuators and sensors) and controllers and other equipment used to run a process to be analyzed by computing system 110. Process equipment 130 could also include all of the networking equipment (e.g., routers, switches, servers, gateways, firewalls, etc.) necessary for computing system 110 to communicate to process equipment 130. Computing system 110 could communicate to process equipment 130 over various types of networks, such as a local area network (LAN), wide area network (WAN), or virtual private network (VPN) allowing computing system 110 to be located remotely or locally with respect to process equipment 130. Computing system 110 could communicate to process equipment 130 periodically or in real-time.

Computing system 110 could include one or more servers, clients, workstations, personal computers, etc. A data server (not shown) in process equipment 130 could collect data from various controllers and other devices in process equipment 130 and communicate to computing system 110, or computing system 110 could communicate directly to the controllers and other devices in process equipment 130. Alternatively, computing system 110 could include a data server (not shown) to communicate with the controllers and devices in process equipment 130 and also include a separate data analyzing server (not shown) to analyze the data collected from process equipment 130.

Figure 1B:
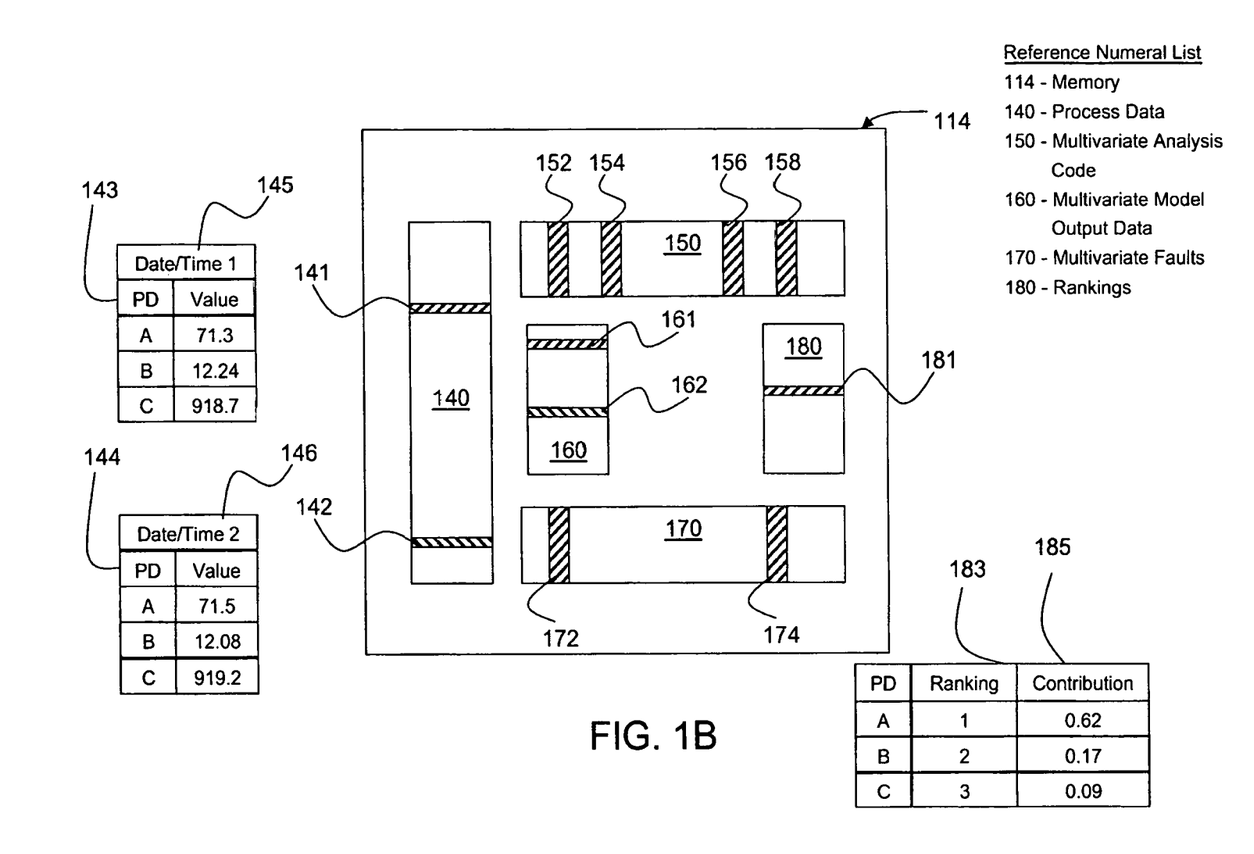
FIG. 1B is a block diagram of a memory to be incorporated in one embodiment.

FIG. 1B is a block diagram of a memory 114 to be incorporated in one embodiment. Referring to FIGS. 1A and 1B, memory 114 could store different types of data, variables, and code, some of which are described below.

Memory 114 could store process data 140. Process data 140 includes process variables and process parameters. Process variables are physical values and conditions sampled over time that indicate the state of process equipment 130. Examples of process variables include temperatures, pressures, flow rates, voltages, amperages, and other physical characteristics that can be monitored in process equipment 130. Process parameters include any other variable that can be monitored in process equipment 130. Examples of process parameters could include, but are not limited to operator settings, the value of any signal transmitted or received by computing system 110, any computed value from a calculation involving one or more process variables (e.g., a mean, standard deviation, or variance), or any other computed value within process equipment 130 or computing system 110. In some embodiments, at least some of the process data 140 could be derived from a physical measurement of a process variable.

Process data 140 may be sampled over time and stored in data sets according to the date and time at which the sample was taken. Process data set 141 as represented by table 143 and process data set 142 as represented by table 144 provide examples of how process data 140 could be stored according to sampling time. Process data set 141 includes the values at a first time 145 of portions of process data 140, such as process data A, B, and C. Process data A, B, and C could represent process variables, such as a temperature A, an amperage B, and a flow rate C as measured in process equipment 130. Process data set 142 includes the values of the process variables A, B, and C at a second time 146. Process data 140 could be stored according to different schemes besides date and time, such as according to equipment runtime or storing could be triggered by different events, such as a particular event of a process. Besides differentiating by time, process data sets (e.g., 141, 142) could be further organized by equipment or parts of equipment. Numerous process data sets (e.g., 141, 142) could be stored in memory 114. Each process data set (e.g., 141, 142) is a snapshot of process data 140 at a specific point in time. A series of snapshots could be used as historical data for process equipment 130.

Memory 114 could also store multivariate analysis code 150. Multivariate analysis code 150 could be stored in a non-transitory computer-readable storage medium. Examples of non-transitory computer-readable storage mediums include but are not limited to a hard disk drive, a solid-state memory, a network attached storage (NAS), a read-only memory, a flash memory device, a CD-ROM (Compact Disc-ROM), a CD-R, or a CD-RW, a DVD (Digital Versatile Disc), a magnetic tape, and other optical and non-optical data storage devices. The non-transitory computer readable medium can also be distributed over a network coupled computer system, so that the computer readable code is stored and executed in a distributed fashion.

Multivariate analysis code 150 could include a multivariate model 152. Numerous multivariate models could be included in multivariate analysis code 150. The process data 140 included for a specific multivariate model could be configured by a model developer without any adjustment allowed by an operator. Alternatively, the process data 140 to be included in one or more of the models could be adjustable by an operator. Examples of multivariate models that could be stored in multivariate analysis code 150 could include models developed using Support Vector Machine Regression, Naïve Bayes Regression, and Logistic Regression.

Multivariate analysis code 150 could include a multivariate output routine 154 for applying process data 140 to multivariate model 152 to generate multivariate model output data 160. Multivariate model output data 160 could be a scalar output generated from iteratively applying process data sets (e.g., 141, 142) to multivariate model 152 for a plurality of time points (e.g., 145, 146) in the historical data. Because the multivariate model output data 160 is generated using process data 140 sampled at specific times (e.g., 145, 146), data points in multivariate model output data 160 could also be stored with a corresponding timestamp (not shown) or linked to a timestamp (e.g., 145, 146) of the process data set (e.g., 141, 142) which was used to generate the multivariate model output data 160.

Process data analyzer 100 could use the multivariate model output data 160 to monitor process equipment 130 for multivariate faults 170. Memory 114 could store multivariate faults 170. Multivariate faults 170 could include an existing multivariate fault 172 and a new multivariate fault 174. Existing multivariate fault 172 could be a multivariate fault set by a multivariate model developer, and a new multivariate fault 174 could be a multivariate fault set by an operator analyzing multivariate model output data 160 and concluding that a new multivariate fault is needed. Memory 114 could store information for each multivariate fault 170, such as names and descriptions of the fault as well as alarm limits and thresholds that trigger the fault. Processor 112 could execute a multivariate fault routine 156 in multivariate analysis code 150 to monitor process equipment 130 for the existence of any multivariate faults 170.

Figure 2:
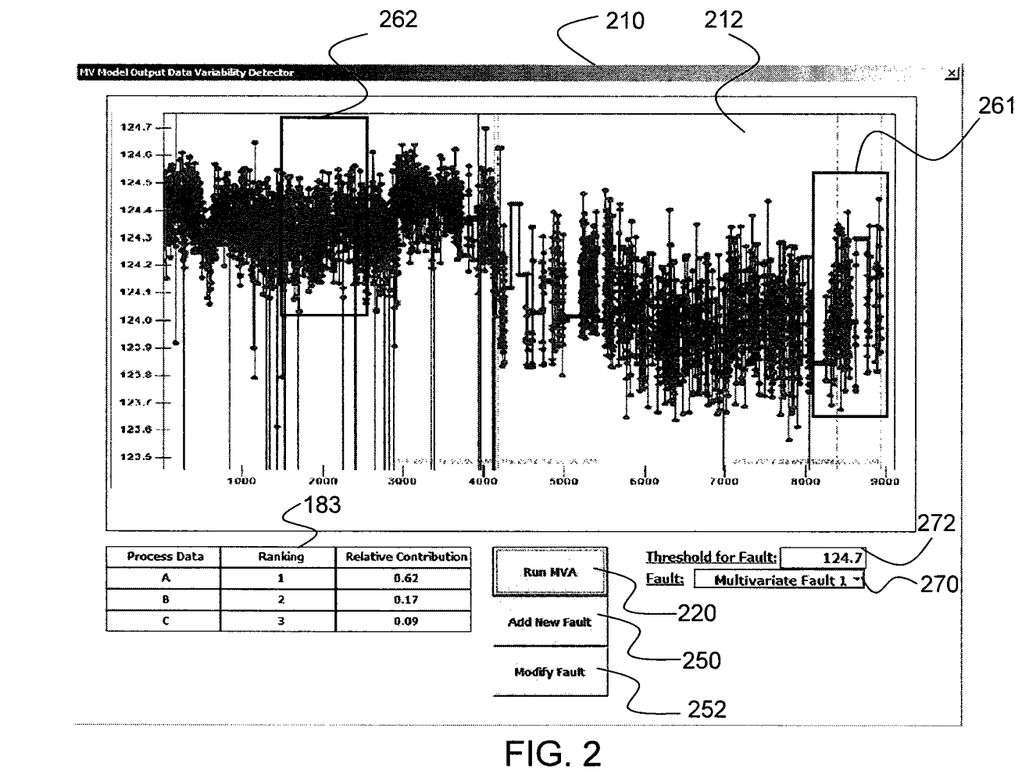
FIG. 2 is an exemplary view to be displayed on a user interface in accordance with one embodiment.

FIG. 2 is an exemplary first view 210 that could be displayed on user interface 120 in one embodiment. Referring to FIGS. 1A, 1B, and 2, user interface 120 could be a GUI. Computing system 110 could be configured to display a trend 212 on first view 210. Trend 212 could show multivariate model output data 160 over time, equipment runtime, or runtime of specific portion or event of a process. Computing system 110 could be configured to accept selection on first view 210 of a first range 161 of multivariate model output data 160 stored in memory 114. Computing system 110 could be configured to accept the selection of first range 161 by recognizing a first-range boundary 261 set around a portion of the multivariate model output data 160 displayed on trend 212. Computing system 110 and user interface 120 could be configured to accept the selection of the first range 161 through use of a mouse, stylus, finger, keyboard, or any other conventional ways to interact with a user interface, such as user interface 120. The method of selecting the first range 161 described here is not meant to be limiting and any number of methods could be used, such as such as entering a beginning time and an end time with a keyboard for the first range 161, clicking a beginning point and an end point for the first range 161, etc.

Computing system 110 could be further configured to accept a selection of a second range 162 on first view 210. Computing system 110 could be configured to accept a selection of the second range 162 by recognizing a second-range boundary 262 set around a portion of the multivariate model output data 160 on trend 212. Ranges 161, 162 could be completely separate, partially overlap, or one range 161, 162 could completely surround the other range 161, 162. Ranges 161, 162 could be chosen for displaying similar or different features on trend 212. Additional routines (not shown) in multivariate analysis code 150 could also be developed to aid an operator in locating irregular or distinctive features in multivariate model output data 160 that may be worth analyzing. Additional routines in multivariate analysis code 150 could also be developed to aid an operator in selecting an appropriate second range 162 to analyze after a first range 161 has already been selected.

Computing system 110 could be configured to display a run button 220 on first view 210. Run button 220 could be used to initiate a multivariate analysis routine 158. Multivariate analysis routine 158 could include instructions for determining one or more process data 140 causing a variability between first range 161 and second range 162 of the multivariate model output data 160. Multivariate analysis routine 158 could determine the variability between the two ranges 161, 162 by using multivariate analysis techniques to rank input contribution, such as Partial Least Squares, AdaBoost, and RankBoost.

Multivariate analysis code 150 could check that a first range 161 has been selected before multivariate analysis routine 158 can be initiated by run button 220. If a second range 162 is also selected, then multivariate analysis routine 158 could use both of the selected ranges 161, 162. On the other hand, if second range 162 was not selected, instructions in multivariate analysis routine 158 for execution of the multivariate analysis could include further directions to use all of the multivariate model output data 160 except the first range 161 as the second range 162.

Execution of multivariate analysis routine 158 on various ranges (e.g., 161, 162) could be used to generate rankings 180 of one or more process data 140 contributing most to a difference between the various ranges. For example, execution of multivariate analysis routine 158 on first range 161 and second range 162 could be used to generate a ranking 181, as represented by table 183, of the one or more process data 140 contributing most to a difference between the two ranges 161, 162. Ranking 181 could also include the relative contributions 185 of each process data 140 included in the ranking. Computing system 110 could be configured to display one or more rankings 180 as one or more tables (e.g., table 183) on first view 210.

A ranking, such as ranking 181 could prompt a user of process data analyzer 100 to add a new multivariate fault 174. For example, ranking 181 could show that the main differences between first range 161 and second range 162 are a pressure and a flow measurement made by sensors installed near one another in the same supply line. The pressure and flow differences could possibly alert the operator that there could be a potential problem with a particular valve located in that supply line.

Computing system 110 could be configured to accept the addition of new multivariate faults, such as new multivariate fault 174, on first view 210. Computing system 110 could be configured to display a new fault button 250 on first view 210. New fault button 250 could trigger computing system 110 to accept entry of a fault name in multivariate fault input 270 and entry of a fault threshold in fault threshold input 272 for new multivariate fault 174. Other fault related information, such as fault descriptions, could also be added in other inputs (not shown) on first view 210 or other views (not shown). Multivariate fault routine 156 or another section of multivariate analysis code 150 could have a new fault subroutine (not shown) that stores a new multivariate fault (e.g., 174) in multivariate faults 170 of memory 114. After new multivariate fault 174 is stored in memory 114, multivariate fault routine 156 could begin to monitor process equipment 130 for the existence of new multivariate fault 174.

Computing system 110 could also be configured to accept adjustments to existing multivariate faults, such as existing multivariate fault 172, on first view 210. Computing system 110 could be configured to display a modify fault button 252 on first view 210. Modify fault button 252 could trigger computing system 110 to accept an adjustment to a fault threshold in fault threshold input 272 for existing multivariate fault 172. Computing system 110 could be configured to display other adjustable parameters (not shown), such as a fault description, associated with existing multivariate faults, such as existing multivariate fault 172. Multivariate fault routine 156 or another section of multivariate analysis code 150 could have a modify fault subroutine (not shown) that modifies an existing multivariate fault, such as existing multivariate fault 172, in multivariate faults 170 of memory 114. After adjustments to existing multivariate fault 172 are stored in memory 114, multivariate fault routine 156 could begin to monitor process equipment 130 for the existence of the now modified existing multivariate fault 172.

Referring to FIGS. 1A, 1B, 2 and 3 a method 300 is described for determining one or more causes for variability in process related data, such as process data 140. Process data 140 are stored in memory 114 as process data sets (e.g., 141, 142). Each process data set (e.g., 141, 142) is a snapshot of process data 140 at a specific point in time. A series of snapshots could be used as historical data for process equipment 130.

Figure 3:
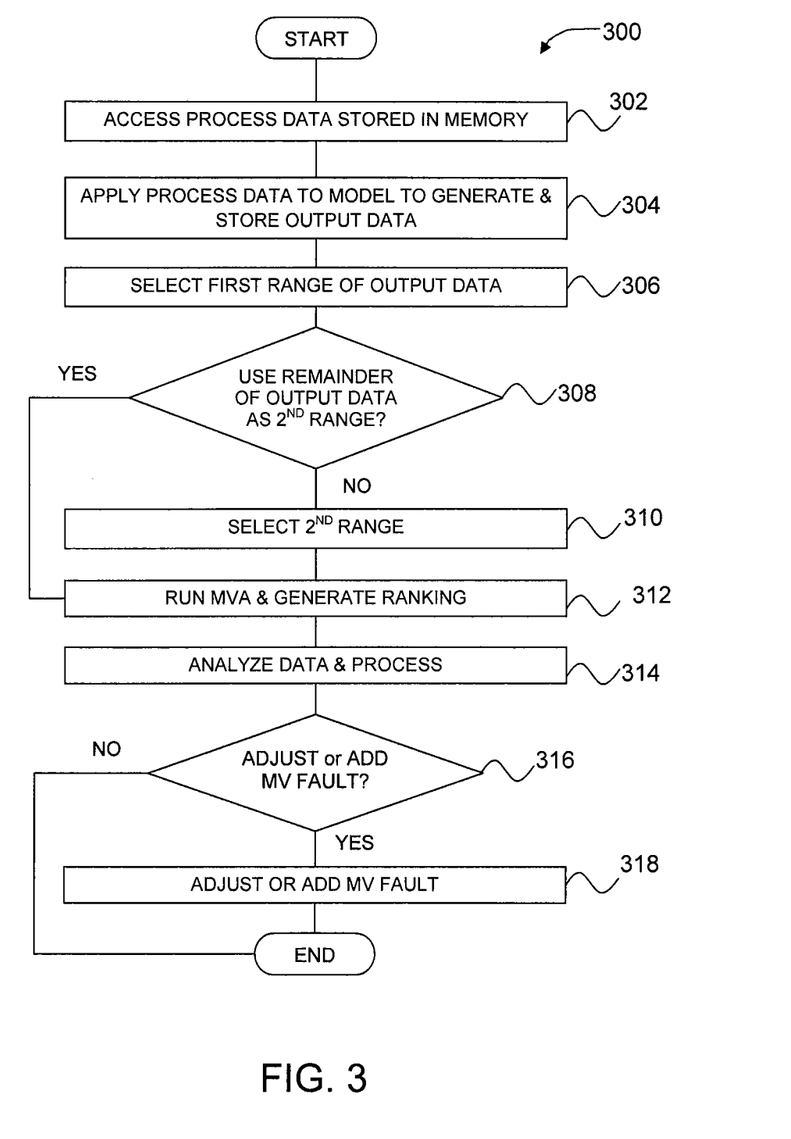
FIG. 3 is a process flow diagram of a process for determining one or more causes for variability in process data according to one embodiment.

At block 302, computing system 110 could be employed to access process data 140 stored in memory 114 as a series of snapshots (e.g., 141, 142) of historical data of a process occurring in process equipment 130. At block 304, computing system 110 could be employed to apply a plurality of the snapshots (e.g., 141, 142) of historical data to a multivariate model 152 to generate multivariate model output data 160 corresponding to the points in time of the snapshots. Multivariate model output data 160 could be stored in memory 114. Multivariate model output data 160 could be a scalar output generated from iteratively applying process data sets (e.g., 141, 142) to multivariate model 152 for a plurality of time points (e.g., 145, 146) in the historical data. Because the multivariate model output data 160 could be generated using process data 140 sampled at specific times (e.g., 145, 146), multivariate model output data 160 could also be stored with a corresponding timestamp (not shown) or linked to a timestamp (e.g., 143, 144) of the process data set (e.g., 141, 142) which was used to generate the multivariate model output data 160.

At block 306, a first range 161 of multivariate model output data 160 could be selected by a user on user interface 120. The selection could be made as described above by setting a first-range boundary 261 around a portion of the multivariate model output data 160 displayed on trend 212 on first view 210. The selection could also be made in numerous other ways as described above.

At block 308, a choice could be made on whether to select a second range 162 to be used by computing system 110 when processor 112 executes multivariate analysis routine 158. If a selection for second range 162 is not made, then computing system 110 could be configured to use all of the multivariate model output data 160 except the first range 161 as the second range 162.

At block 310, a second range 162 can be selected if the choice is made to select the second range 162. The selection could be made as described above by setting a second-range boundary 262 around a portion of the multivariate model output data 160 displayed on trend 212 on first view 210. The selection could also be made in numerous other ways as described above.

At block 312, computing system 110 could be employed to determine one or more process data 140 causing a variability of the multivariate model output data 160 in the first range 161 when compared to the second range 162 of the multivariate model output data 160. The variability of the multivariate model output data 160 in the first range 161 when compared to the second range 162 can be determined by generating a ranking 181, of one or more process data 140 contributing most to a difference between the two ranges 161, 162. Computing system 110 could display a ranking 181 in table 183 with relative contributions 185 on first view 210 of user interface 120.

At block 314, a user can analyze multivariate model output data 160, ranking 181 in table 183, and process equipment 130 to determine if any further action should be taken. At block 316, a user could decide whether or not to take further action by adjusting an existing multivariate fault or adding a new multivariate fault. If a user decides not to adjust an existing multivariate fault or add a new fault, then the user could either end the analysis of the multivariate model output data 160 or execute method 300 again on a different selection of first range 161 and second range 162. Both ranges 161, 162 could be changed or only one of the ranges 161, 162 could be changed. Computing system 110 could also be configured to allow selection of a different multivariate analysis method. A multivariate analysis using a different method could then be run again on the same ranges 161, 162.

At block 318, a user could adjust an existing multivariate fault or add a new multivariate fault. For example, a user could use ranking 181 displayed in table 183 and the multivariate model output data 160 to adjust an existing multivariate fault, such as existing multivariate fault 172. Adjustment of existing multivariate fault 172 in memory 114 could be done by initiating a modify fault subroutine (not shown) as described above, where the subroutine was initiated by modify fault button 252 on first view 210. After adjustments to existing multivariate fault 172 are stored in memory 114, multivariate fault routine 156 could begin to monitor process equipment 130 for the existence of the now modified existing multivariate fault 172, and computing system 110 could then alert an operator to future occurrences of existing multivariate fault 172.

Alternatively, a user could also use ranking 181 displayed in table 183 and the multivariate model output data 160 to add a new multivariate fault, such as new multivariate fault 174. Adding new multivariate fault 174 could be done by initiating a new fault subroutine (not shown) as described above, where the subroutine was initiated by new fault button 250 on first view 210. After new multivariate fault 174 is stored in memory 114, multivariate fault routine 156 could begin to monitor process equipment 130 for the existence of new multivariate fault 174, and computing system 110 could then alert an operator to future occurrences of new multivariate fault 174.

The ability to quickly determine the main causes of variability between two ranges (e.g., 161, 162) of multivariate model output data 160 will allow operators of process equipment to solve problems more quickly and keep process equipment running in optimum condition. As described above, executing a multivariate analysis routine 158 could generate a ranking 181 that identifies measurements from a pressure sensor and flow meter as the two leading causes for variability between ranges 161, 162. The pressure and flow differences could quickly lead an operator to investigate the status of a valve installed near the sensors, and a potential problem could be discovered. Without a routine, such as multivariate analysis routine 158, an operator might be left to scroll through numerous trends of process variables hoping to identify an abnormality in the data. If the operator does identify the same reasons (i.e., measurements from the pressure sensor and flow meter) causing the variability in multivariate model output data 160, it is highly probable that such an identification would consume more time than executing multivariate fault routine 156. If the operator is not able to identify the problem, then the status of the valve described may not be checked until the valve fails, potentially causing loss of product, damage to other equipment, and increased equipment downtime. When a ranking, such as ranking 181, can be used to check the status of process equipment and further cause an operator to adjust an existing multivariate fault or add a new multivariate fault, control over the process equipment can be continually improved. Such continual improvement can be used to in PdM to perform maintenance at the most opportune times and keep the process equipment running in optimum condition.

While the foregoing is directed to typical embodiments, other and further embodiments may be devised without departing from the basic scope thereof, and the scope thereof is determined by the claims that follow.

The invention claimed is:

1. A method for determining one or more causes for variability in data, comprising:
    monitoring process data of process equipment, wherein at least some of the process data comprises data derived from a physical measurement of a process variable by a sensor;
    applying the process data to a multivariate model to generate multivariate model output data;
    displaying the multivariate model output data on a user interface;
    selecting a first range of the multivariate model output data on the user interface;
    employing a computing system, operatively coupled to the user interface, to:
        determine one or more of the process data causing a variability of the multivariate model output data in the first range when compared to a second range of the multivariate model output data, wherein determining the process data causing the variability of the multivariate model output data comprises executing a multivariate analysis on the first range and the second range to generate a ranking of one or more process data contributing most to a difference between the two ranges; and
    using the ranking and the multivariate model output data to adjust an existing multivariate fault or add a new multivariate fault to be monitored by the computing system, wherein the multivariate fault that is adjusted or added is configured to detect a fault related to the process equipment.

2. The method of claim 1, further comprising, before the multivariate analysis is executed, employing the computing system to:
    access process data stored in a memory as a series of snapshots of historical data of a process, each snapshot of historical data comprising values of the process data at a specific point in time;
    apply a plurality of the snapshots of historical data to the multivariate model to generate the multivariate model output data corresponding to the points in time of the snapshots; and
    store the multivariate model output data in the memory.

3. The method of claim 2, wherein the second range includes all of the multivariate model output data except the first range.

4. The method of claim 2, wherein the second range is selected, and the combination of first range and the second range does not include all of the multivariate model output data.

5. The method of claim 1, wherein the ranking and the multivariate model output data are used to adjust an existing multivariate fault.

6. The method of claim 1, wherein the ranking and the multivariate model output data are used to add a new multivariate fault.

7. A process data analyzer, comprising:
    a computing system configured to:
    monitor process data of process equipment, wherein at least some of the process data comprises data derived from a physical measurement of a process variable by a sensor;
    apply the process data to a multivariate model to generate multivariate model output data;
    display the multivariate model output data on a user interface;
    accept a selection of a first range of the multivariate model output data, the computing system comprising:
        a memory for storing multivariate model output data and a code, the code comprising instructions for:
            determining one or more process data causing a variability between the first range and a second range of the multivariate model output data, wherein determining the process data causing the variability of the multivariate model output data comprises executing a multivariate analysis on the first range and the second range to generate a ranking of one or more process data contributing most to a difference between the two ranges; and
            accepting input for adjusting an existing multivariate fault or adding a new multivariate fault, wherein the multivariate fault that is adjusted or added is configured to detect a fault related to the process equipment and the input is derived from the ranking and the multivariate model output data; and
        a processor to execute the instructions.

8. The process data analyzer of claim 7, wherein the code further comprises, before execution of the multivariate analysis, instructions for:
    accessing process data stored in the memory as a series of snapshots of historical data of a process, each snapshot of historical data comprising values of the process data at a specific point in time;
    applying a plurality of the snapshots of historical data to a multivariate model to generate multivariate model output data corresponding to the points in time of the snapshots; and
storing the multivariate model output data in the memory.

9. The process data analyzer of claim 7, wherein the computing system is configured to display a trend on a first view and accept the selection of the first range on the first view, wherein the trend shows the multivariate model output data over time.

10. The process data analyzer of claim 9, wherein the computing system is further configured to accept a selection of the first range by recognizing a boundary set around a portion of the multivariate model output data displayed on the trend.

11. The process data analyzer of claim 10, wherein the instructions for execution of the multivariate analysis further comprises directions to use all of the remaining multivariate model output data except the first range as the second range if the second range is not selected.

12. The process data analyzer of claim 10, wherein the computing system is further configured to accept a selection of the second range made on the first view.

13. The process data analyzer of claim 12, wherein the computing system is further configured to display the ranking on the first view.

14. The process data analyzer of claim 13, wherein the computing system is further configured to accept the adjustment to an existing multivariate fault or addition of the new multivariate fault made on the first view.

15. A non-transitory computer-readable storage medium storing code for execution by a processor, wherein a code, when executed by a processor, performs an operation for determining one or more causes for variability in data comprising:
   monitoring process data of process equipment, wherein at least some of the process data comprises data derived from a physical measurement of a process variable by a sensor;
   applying the process data to a multivariate model to generate multivariate model output data;
   displaying the multivariate model output data on a user interface;
   determining one or more process data causing a variability between a first range and a second range of a multivariate model output data, wherein the first range is selected by a user, wherein determining the process data causing the variability of the multivariate model output data comprises executing a multivariate analysis on the first range and the second range to generate a ranking of one or more process data contributing most to a difference between the two ranges; and
   accepting input for adjusting an existing multivariate fault or adding a new multivariate fault, wherein the multivariate fault that is adjusted or added is configured to detect a fault related to the process equipment and the input is derived from the ranking and the multivariate model output data.

16. The non-transitory computer-readable storage medium of claim 15, wherein the code, when executed by the processor, performs an operation further comprising allowing for a selection of the second range.

17. The non-transitory computer-readable storage medium of claim 16, wherein the code, when executed by the processor, performs an operation further comprising using all of the remaining multivariate model output data except the first range as the second range if the second range is not selected.

* * * * *